United States Patent
Brooks et al.

(10) Patent No.: US 7,415,485 B2
(45) Date of Patent: Aug. 19, 2008

(54) WORKFLOW APPLICATION HAVING LINKED WORKFLOW COMPONENTS

(75) Inventors: Patrick J. Brooks, Toronto (CA); Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/225,678

(22) Filed: Sep. 13, 2005

(65) Prior Publication Data

US 2007/0061358 A1    Mar. 15, 2007

(51) Int. Cl.
*G06F 17/30* (2006.01)
(52) U.S. Cl. ............. 707/104.1; 707/104.1; 707/103 R; 717/166
(58) Field of Classification Search ............. 707/103 R, 707/103 Y, 103 X, 103 Z; 717/166
See application file for complete search history.

(56) References Cited

U.S. PATENT DOCUMENTS

| | | | |
|---|---|---|---|
| 5,627,764 A | 5/1997 | Schutzman et al. | |
| 5,768,506 A | 6/1998 | Randell | |
| 6,279,009 B1 | 8/2001 | Smirnov et al. | |
| 6,546,364 B1 | 4/2003 | Smirnov et al. | |
| 6,697,784 B2 | 2/2004 | Bacon et al. | |
| 6,845,503 B1* | 1/2005 | Carlson et al. | 717/166 |
| 6,874,008 B1 | 3/2005 | Eason et al. | |
| 7,114,152 B2* | 9/2006 | Hogstrom et al. | 717/166 |
| 7,386,529 B2* | 6/2008 | Kiessig et al. | 707/1 |
| 2004/0078105 A1* | 4/2004 | Moon et al. | 700/100 |
| 2004/0143597 A1* | 7/2004 | Benson et al. | 707/104.1 |

* cited by examiner

*Primary Examiner*—Hung T Vy
*Assistant Examiner*—Hanh B Thai
(74) *Attorney, Agent, or Firm*—David A. Mims; Rudolf O. Siegesmund; Gordon & Rees LLP

(57) ABSTRACT

The invention is a computer-implemented workflow application comprising one or more workflow components, each workflow component comprising an object having a metadata property; a workflow program comprising workflow components connected together to execute an operational workflow; a class loader program operable to introspect the objects and extract the metadata properties when each workflow component of the workflow program is executed, and store the metadata properties in a memory; and a workflow manager program operable to analyze the metadata stored in the memory and provide requested status information.

17 Claims, 2 Drawing Sheets

WORKFLOW APPLICATION HAVING LINKED WORKFLOW COMPONENTS

CROSS-REFERENCE TO RELATED APPLICATION

The present invention is related to the subject matter of U.S. patent application Ser. No. 11/225.671, entitled "Workflow operational console," incorporated herein by reference.

FIELD OF THE INVENTION

The present invention comprises subject matter directed to organizing and relating workflow components in an operational workflow process to facilitate the reporting and display of workflow status information.

BACKGROUND OF THE INVENTION

A "workflow" is a familiar concept to many people. Generally, a "workflow" is any series of steps or activities necessary for completing a particular task. A "workflow component" is any convenient set of related activities that the workflow treats as a single unit of activity. For example, the activities required to process an airline passenger before boarding an airplane could be described as a workflow. In such a scenario, the carrier generally verifies a passenger's identity, confirms the passenger's reservation, allocates a seat on the airplane, and prints a boarding pass. The carrier also may process a credit card transaction to pay for the ticket if the passenger has not yet paid. If the passenger has baggage, the carrier also may print a baggage tag. These activities likely are distributed among a number of employees throughout the organization. From the airline's perspective, then, the workflow is comprised of components executed by various employees. Thus, the workflow components of a "check-in" workflow could be described as: (1) get identification; (2) read passenger's credit card; (3) identify passenger's reservation; (4) get passenger's baggage; (5) allocate passenger's seat; (6) print passenger's boarding pass; (7) print passenger's baggage tag; and so forth. Some, all, or none, of these workflow components may be automated.

A "workflow application" is any computer program designed to coordinate or manage a workflow, particularly in an enterprise setting. Thus, in the above example, a workflow application could coordinate the workflow components among the various employees that are involved in the transaction.

Workflow applications are common in the enterprise context. Many workflow applications are highly specialized for a specific industry, such as the medical application disclosed in U.S. Pat. No. 6,697,783 (issued Feb. 24, 2004). Other such systems, though, have been designed to accommodate more generalized needs, including the system disclosed in U.S. Pat. No. 6,567,783 (issued May 20, 2003).

Many workflow applications also track the status of workflows and provide a console or other means for displaying status information to a user. In practice, a single enterprise often uses a variety of workflow applications to coordinate and manage its everyday operations. But conventional workflow applications are stand-alone applications that are incapable of interacting with other workflow applications in a heterogeneous business system. An enterprise that uses a variety of workflow applications may require many consoles to monitor all of its workflows.

Thus, there is a need in the art for a system that organizes and relates workflow components in an operational workflow process to facilitate the reporting and display of workflow status information.

SUMMARY OF THE INVENTION

The invention described in detail below is a computer-implemented workflow application comprising one or more workflow components, each workflow component comprising an object having a metadata property; a workflow program comprising workflow components connected together to execute an operational workflow; a class loader program operable to introspect the objects and extract the metadata properties when each workflow component of the workflow program is executed, and to store the metadata properties in a memory; and a workflow manager program operable to analyze the metadata stored in the memory and provide requested status information.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single program that configures and enables one or more general-purpose computers to implement the novel aspects of the invention. For illustrative purposes, the inventive computer program will be referred to as the "workflow program."

Figure 1:
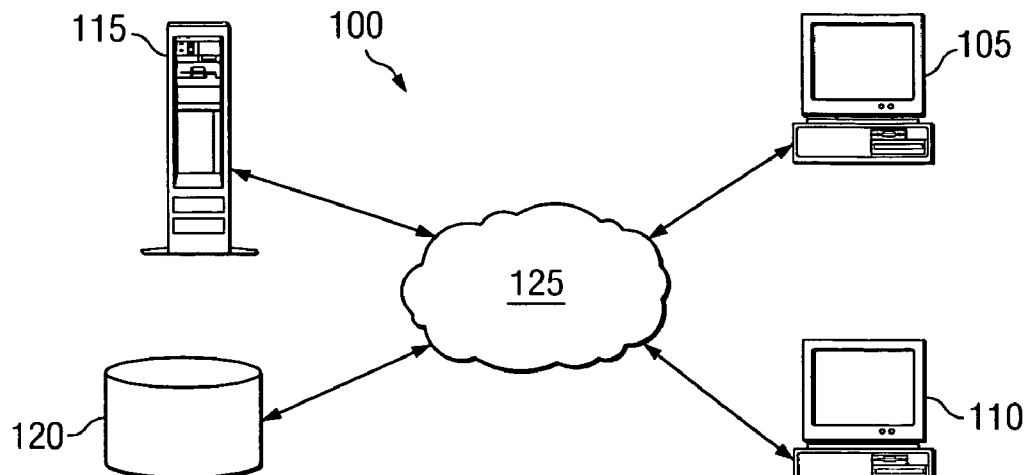
FIG. 1 illustrates an exemplary network of hardware devices in which the present invention can be practiced.

Additionally, the workflow program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
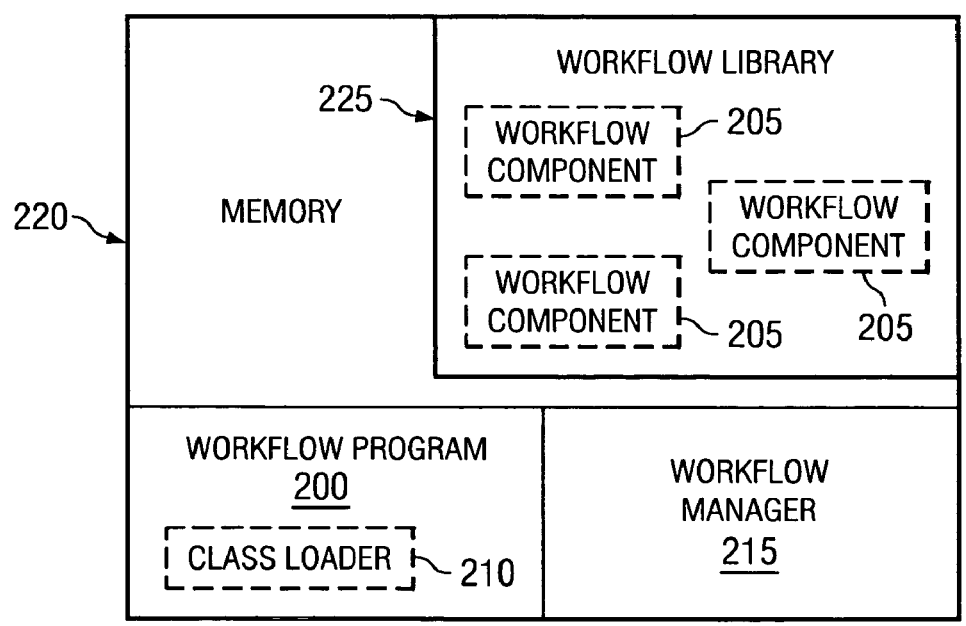
FIG. 2 is a schematic of a memory having components of the present invention stored therein.

Workflow program 200 and its components, including workflow components 205 and class loader 210 typically are stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media and network nodes. Workflow program 200 and its components may reside in any single network node, such as network nodes 105-120, or may be distributed across several network nodes. Thus, FIG. 2 is included merely as a descriptive expedient and does not necessarily reflect any particular physical embodiment of memory 220. As depicted in FIG. 2, though, memory 220 may include additional data and programs. Of particular import to workflow program 200, memory 220 may include workflow manager 215, with which workflow program 200 interacts.

Workflow program 200 is described herein as an object-oriented program, and more particularly as an object-oriented JAVA application. JAVA provides many tools and resources that facilitate the development of distributed, modular applications, including an introspection mechanism and a vast library of classes distributed by the vendor. The significance of these tools will become apparent in the description that follows. Notwithstanding the advantages of JAVA, though, those skilled in the art will recognize that the principles and functions described below may be implemented in a variety of programming languages using a variety of programming models.

Workflow program 200 comprises an assembly of workflow components 205, each of which represents any programming unit designed to coordinate or manage a convenient set of related activities that can be treated as a single unit of activity. In the embodiment described here, each workflow component 205 is implemented as an object, which is defined by a specific class, and is stored in a workflow library. Once assembled, workflow program 200 also may be stored in the workflow library, along with other workflow programs. Like workflow components 205, workflow programs stored in the library can then be combined to produce new workflow programs. The workflow library is depicted as workflow library 225 in FIG. 2.

Each workflow component class includes properties and methods that support the operational functions of the workflow component, but also include metadata properties that provide information about the workflow component itself. These classes also may include metadata methods that provide indirect access to these metadata properties. Examples of metadata properties include, without limitation, unique identifiers, descriptors, approval flags, and checksum values. The significance of these types of metadata properties are discussed below in more detail.

As described herein, workflow program 200 includes class loader 210, but those skilled in the art will appreciate that class loaders commonly are invoked from other software elements. Particularly in the JAVA environment, class loaders typically are invoked by the JAVA virtual machine. Basic class loaders merely create instances of particular classes (i.e. "objects") at run-time, but class loaders can be customized to provide additional functions. Here, class loader 210 is a custom class loader that creates an instance of workflow component 205 as needed at run-time, and also introspects workflow component 205 to extract its metadata properties. Class loader 210 then can store the metadata properties in a memory, such as memory 220. Class loader 210 also can track the number and type of each workflow component that it creates, and store that information in memory.

Finally, workflow program 200 interacts with workflow manager 215. Workflow manager 215 analyzes the metadata properties and other data collected by class loader 210, and provides requested status information to other programs or to an end-user.

Figure 3:
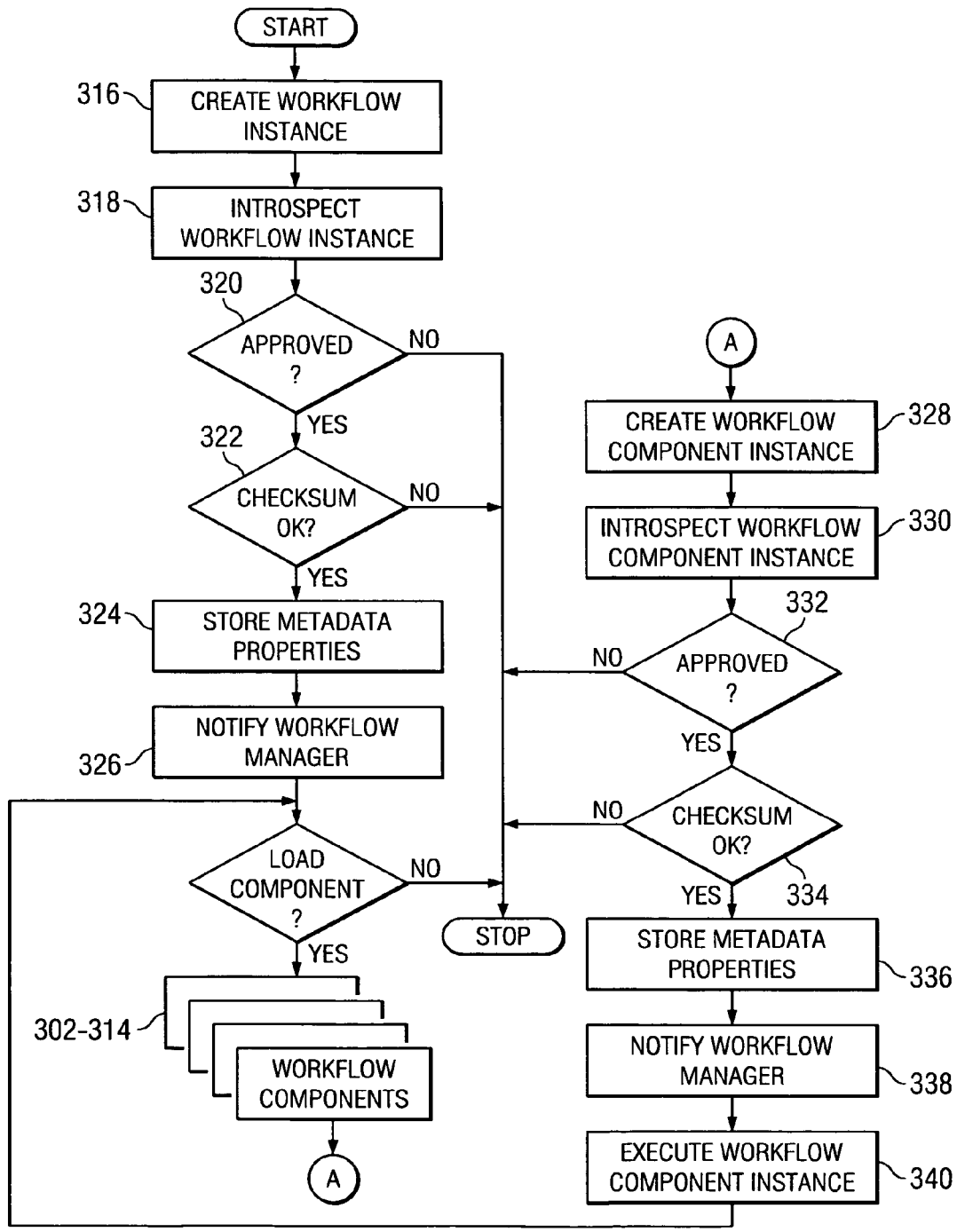
FIG. 3 is a flowchart of an embodiment of the present invention.

The operation of workflow program 200 is illustrated in FIG. 3 using a simple airline check-in workflow as an example. Of course, those skilled in the art will appreciate the general applicability of the principles described herein to any workflow. In this example, though, the operational workflow embodied in workflow program 200 comprises workflow components 302-314, which are assembled by a workflow developer at design-time in an order that facilitates the check-in activities. For example, workflow component 302 prompts an operator to collect proper identification and enter identification data, such as the passenger's name. Workflow component 304 prompts an operator to collect and enter a credit card number from the passenger. Workflow component 306 then prompts the operator to collect reservation information from the passenger and queries the reservation database to identify the passenger's reservation. Workflow component 308 prompts an operator to collect the passenger's baggage and enter baggage data, such as the number of bags. Workflow component 310 then allocates a seat to the passenger. Workflow component 312 prints the passenger's boarding pass. Finally, workflow component 314 prints the passenger's baggage claim ticket. Each of workflow components 302-314 include metadata properties that describe the component's class, identify the author of the workflow component, indicate the approval status of the workflow component, and provide a checksum value for the workflow component. In the embodiment described here, workflow program 200 also includes these metadata properties.

An operator invokes workflow program 200 when a passenger arrives at the ticket counter or gate and requests to check-in. Many contemporary hardware and software platforms, including JAVA, support distributed processing architectures. Thus, those skilled in the art will appreciate that an operator may invoke workflow program 200 remotely over a network, such as exemplary network 100, or locally on any workstation within the network. As FIG. 3 illustrates, class loader 210 first creates an instance of workflow program 200 (316) and introspects workflow program 200 to extract its metadata properties (318). Optionally, class loader 210 may check the approval flag (320) to verify that workflow program 200 has been approved for enterprise use, and may validate the checksum value (322) to confirm that workflow program 200 has not been altered or tampered with since receiving approval. Class loader 210 then records the metadata properties (324) in a memory and notifies workflow manager 215 that a new instance of workflow program 200 has been created (326), or alternatively, workflow manager 215 periodically polls the memory to retrieve updated metadata properties. Class loader 210 next creates an instance of workflow component 302 (328), and introspects this component to extract its metadata properties (330). Optionally, class loader 210 again verifies the integrity of workflow component 302 by checking its approval flag (332) and checksum value (334). And again, class loader 210 records the metadata properties (336) in memory and notifies workflow manager 215 that a new instance of workflow component 302 has been created (338), or alternatively, workflow manager 215 periodically polls the memory to retrieve updated information. Workflow component 302 then executes its check-in functions (340), which are described above. As FIG. 3 illustrates, workflow program 200 then invokes workflow components 304-314 to execute their respective check-in functions in the sequence prescribed by the workflow developer, while class loader 210 creates an instance of each workflow component, introspects each workflow component, and records each workflow component's metadata properties, as just described.

As class loader 210 extracts and records metadata properties, workflow manager 215 analyzes the metadata properties and produces requested workflow status information. The workflow status information can be determined and requested by an end user, or by a console program. Given certain metadata properties, such as those identified above, workflow manager 215 can identify each workflow component and enforce security policies. Much like class loader 210, workflow manager 215 can check approval flags and checksum values to add another layer of security to workflow applications.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer-implemented workflow application comprising:
   one or more workflow components, each workflow component comprising an object having a metadata property;
   a workflow program comprising workflow components connected together to execute an operational workflow;
   a class loader program operable to
      introspect the objects and extract the metadata properties when each workflow component of the workflow program is executed, and
      store the metadata properties in a memory; and
   a workflow manager program operable to analyze the metadata stored in the memory and provide requested status information;
   wherein the metadata property is a checksum value and the workflow application is operable to check the checksum value of each workflow component and to terminate the workflow application if the checksum value indicates the workflow component has been altered.

2. The computer-implemented workflow application of claim 1 wherein:
   each object further has a second metadata property;
   the second metadata property is an approval flag that indicates an approval status for each workflow component; and
   the class loader program further is operable to check the approval flag of each workflow component and to terminate the workflow application if the workflow component is not approved.

3. The computer-implemented workflow application of claim 1 wherein:
   the class loader program further is operable to check the checksum value of each workflow component and to terminate the workflow application if the checksum value indicates the workflow component has been altered.

4. The computer-implemented workflow application of claim 2 wherein:
   the class loader program further is operable to check the checksum value of each workflow component and to terminate the workflow application if the checksum value indicates the workflow component has been altered since approval.

5. The computer-implemented workflow application of claim 1 wherein:
   each object further has a second metadata property;
   the second metadata property is an approval flag that indicates an approval status for each workflow component; and
   the workflow manager program further is operable to check the approval flag of each workflow component and to terminate the workflow application if the workflow component is not approved.

6. The computer-implemented workflow application of claim 1 wherein:
   the workflow manager program further is operable to check the checksum value of each workflow component and to terminate the workflow application if the checksum value indicates the workflow component has been altered.

7. The computer-implemented workflow application of claim 2 wherein:
   the workflow manager program further is operable to check the checksum value of each workflow component and to terminate the workflow application if the checksum value indicates the workflow component has been altered since approval.

8. The computer-implemented workflow application of claim 1 wherein:
   each workflow component is a JAVA workflow component;
   the class loader program is a JAVA class loader; and
   the workflow manager program is a JAVA workflow manager program.

9. The computer-implemented workflow application of claim 1 wherein:
   each object further has a second metadata property;
   the second metadata property is an approval flag that indicates an approval status for each workflow component;
   the class loader program further is operable to
      check the approval flag of each workflow component and to terminate the workflow application if the workflow component is not approved, and
      check the checksum value of each workflow component and to terminate the workflow application if the checksum value indicates the workflow component has been altered since approval; and
   the workflow manager program further is operable to
      check the approval flag of each workflow component and to terminate the workflow application if the workflow component is not approved, and
      check the checksum value of each workflow component and to terminate the workflow application if the checksum value indicates the workflow component has been altered since approval.

10. A computer-readable memory having a computer program for performing a method of managing a workflow, the method comprising:
executing an operational workflow assembled from workflow components, wherein each workflow component comprises an object having a metadata property;
introspecting the objects and extracting the metadata properties when each workflow component of the operational workflow is executed;
storing the metadata properties in a memory;
analyzing the metadata stored in the memory to provide requested status information;
checking a checksum value of each workflow component; and
terminating the operational workflow if the checksum value indicates the workflow component has been altered.

11. The computer-readable memory of claim 10, wherein the metadata property is an approval flag that indicates an approval status for each workflow component and the method further comprises:
checking the approval flag of each workflow component; and
terminating the operational workflow if the workflow component is not approved.

12. The computer-readable memory of claim 10, wherein the metadata property comprises the checksum value.

13. The computer-readable memory of claim 11, wherein each object further has a second metadata property and the second metadata property comprises the checksum value.

14. A computer system comprising:
a processor;
a memory coupled to the processor; and
a computer program means stored in the memory for causing the processor to
execute an operational workflow assembled from workflow components, wherein each workflow component comprises an object having a metadata property;
introspect the objects and extract the metadata properties when each workflow component of the operational workflow is executed;
store the metadata properties in the memory;
analyze the metadata stored in the memory to provide requested status information;
check a checksum value of each workflow component, and
terminate the operational workflow if the checksum value indicates the workflow component has been altered.

15. The computer system of claim 14 wherein:
the metadata property is an approval flag that indicates an approval status for each workflow component; and
the computer program means further causes the processor to
check the approval flag of each workflow component, and
terminate the operational workflow if the workflow component is not approved.

16. The computer system of claim 14 wherein:
the metadata property comprises the checksum value.

17. The computer system of claim 15 wherein:
each object further has a second metadata property; and
the second metadata property comprises the checksum value.

* * * * *